United States Patent
Caprioli (10) Patent No.: US 10,063,569 B2
(45) Date of Patent: Aug. 28, 2018

(54) CUSTOM PROTECTION AGAINST SIDE CHANNEL ATTACKS

(71) Applicant: Intel Corporation, Santa Clara, CA (US)

(72) Inventor: Paul Caprioli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/666,719

(22) Filed: Mar. 24, 2015

(65) Prior Publication Data

US 2016/0285896 A1 Sep. 29, 2016

(51) Int. Cl.
*G06F 12/14* (2006.01)
*G06F 9/30* (2018.01)
*G06F 21/55* (2013.01)
*H04L 29/06* (2006.01)
*G06F 21/72* (2013.01)
*G06F 21/60* (2013.01)
*H04L 9/00* (2006.01)
(Continued)

(52) U.S. Cl.
CPC ........ *H04L 63/1416* (2013.01); *G06F 21/125* (2013.01); *G06F 21/556* (2013.01); *G06F 21/60* (2013.01); *G06F 21/71* (2013.01); *G06F 21/72* (2013.01); *H04L 9/003* (2013.01); *H04L 63/1441* (2013.01); *H04L 63/162* (2013.01)

(58) Field of Classification Search
CPC ...... G06F 21/125; G06F 21/558; G06F 21/00; G06F 21/10; G06F 21/556; G06F 21/60; G06F 21/71; G06F 2207/7223; G06F 21/72; H04L 9/003; H04L 63/1416; H04L 63/1441
See application file for complete search history.

(56) References Cited

U.S. PATENT DOCUMENTS 6,282,663 B1 * 8/2001 Khazam .................... G06F 1/32 712/233
8,539,254 B1 * 9/2013 Bridgford ............... H04L 67/34 713/100

(Continued)

FOREIGN PATENT DOCUMENTS

TW 200801964 A 1/2008
TW 200928736 A 7/2009

OTHER PUBLICATIONS

Ghosh, Sudeep, Jason Hiser, and Jack W. Davidson. "Software protection for dynamically-generated code." Proceedings of the 2nd ACM SIGPLAN Program Protection and Reverse Engineering Workshop. ACM, 2013.*

(Continued)

*Primary Examiner* — Michael Simitoski
(74) *Attorney, Agent, or Firm* — Nicholson De Vos Webster & Elliott LLP (57) ABSTRACT

Embodiments of an invention for custom protection against side channel attacks are disclosed. In one embodiment, a processor includes instruction hardware and execution hardware. The instruction hardware is to receive an instruction to provide for shielding code against side channel attacks, wherein the instruction includes a first operand to specify one of a plurality of levels of protection. The execution hardware is to execute the instruction, wherein execution of the instruction includes configuring the processor to provide a specified level of protection.

22 Claims, 5 Drawing Sheets

METHOD 400

(51) Int. Cl.
*G06F 21/12* (2013.01)
*G06F 21/71* (2013.01)

(56) References Cited

U.S. PATENT DOCUMENTS

| | | | | |
|---|---|---|---|---|
| 8,607,209 B2* | 12/2013 | Chheda | G06F 9/3846 | 712/208 |
| 9,141,793 B2* | 9/2015 | Naccache | G06F 21/558 | |
| 2004/0153672 A1* | 8/2004 | Watt | G06F 9/3012 | 726/22 |
| 2006/0026525 A1* | 2/2006 | Fischer | G06F 9/30101 | 715/741 |
| 2006/0048230 A1* | 3/2006 | Hameau | G06F 21/558 | 726/26 |
| 2006/0259752 A1* | 11/2006 | Jeremiassen | G06F 9/30072 | 712/239 |
| 2007/0050619 A1* | 3/2007 | Miyamori | G06F 9/30181 | 713/164 |
| 2007/0160196 A1* | 7/2007 | Timmermans | G06F 7/00 | 380/28 |
| 2007/0277023 A1* | 11/2007 | Weiberle | G06F 9/30181 | 712/229 |
| 2008/0109625 A1* | 5/2008 | Erlingsson | G06F 12/0802 | 711/163 |
| 2008/0155679 A1* | 6/2008 | Sebot | G06F 21/556 | 726/16 |
| 2008/0168258 A1* | 7/2008 | Armstrong | G06F 9/30101 | 712/43 |
| 2008/0209550 A1* | 8/2008 | Di Iorio | G06F 21/558 | 726/22 |
| 2009/0010424 A1 | 1/2009 | Qi et al. | | |
| 2009/0089564 A1* | 4/2009 | Brickell | G06F 9/30003 | 712/239 |
| 2009/0092245 A1 | 4/2009 | Fumaroli et al. | | |
| 2009/0172268 A1* | 7/2009 | Naccache | G06F 21/558 | 711/103 |
| 2009/0293132 A1* | 11/2009 | Henry | G06F 21/72 | 726/27 |
| 2010/0011344 A1* | 1/2010 | Guterman | G06F 21/75 | 717/124 |
| 2010/0067685 A1* | 3/2010 | Okita | H04L 9/003 | 380/28 |
| 2010/0169623 A1* | 7/2010 | Dice | G06F 9/3842 | 712/229 |
| 2010/0281273 A1* | 11/2010 | Lee | G06F 21/72 | 713/190 |
| 2012/0084759 A1* | 4/2012 | Candea | G06F 11/3612 | 717/126 |
| 2012/0331307 A1* | 12/2012 | Fernandez Gutierrez | G06F 21/72 | 713/190 |
| 2012/0331309 A1* | 12/2012 | Scott | G06F 21/558 | 713/194 |
| 2013/0191825 A1* | 7/2013 | Muff | G06F 9/30 | 718/1 |
| 2013/0205080 A1* | 8/2013 | Felton | G06F 21/79 | 711/105 |
| 2013/0301826 A1* | 11/2013 | Gueron | H04L 9/002 | 380/28 |
| 2013/0346781 A1 | 12/2013 | Chung et al. | | |
| 2014/0189881 A1* | 7/2014 | Lindsay | G06F 21/60 | 726/27 |
| 2015/0012737 A1* | 1/2015 | Newell | G06F 21/575 | 713/2 |
| 2015/0063561 A1* | 3/2015 | Teglia | H04L 9/002 | 380/28 |
| 2015/0074159 A1* | 3/2015 | Poschmann | G09C 1/00 | 708/270 |
| 2015/0268970 A1* | 9/2015 | Mudusuru | G06F 9/4411 | 713/1 |
| 2015/0278555 A1* | 10/2015 | Melzani | H04L 9/00 | 713/192 |

OTHER PUBLICATIONS

Yuemei, He, et al. "A new software approach to defend against cache-based timing attacks." Information Engineering and Computer Science, 2009. ICIECS 2009. International Conference on. IEEE, 2009.*

Godse, Anthony Gregerson Aditya. "An Examination of the Adaptation of Simple Branch Prediction Analysis Attacks to the Core 2 Duo."*

Page, Dan. "Partitioned Cache Architecture as a Side-Channel Defence Mechanism." IACR Cryptology ePrint archive 2005.2005 (2005): 280.*

International Search Report and Written Opinion received for PCT Patent Application No. PCT/US2016/019019, dated Jun. 2, 2016, 13 pages.

Office Action and Search Report from foreign counterpart Taiwan Patent Application No. 105104965, dated Jun. 28, 2017, 20 pages.

* cited by examiner

SHIELD instruction format 300

| Opcode310 | Operand 320 | Page ID 330 |

FIGURE 4
METHOD 400

FIGURE 5
METHOD 500

CUSTOM PROTECTION AGAINST SIDE CHANNEL ATTACKS

BACKGROUND

1. Field

The present disclosure pertains to the field of information processing, and more particularly, to the field of security in information processing systems.

2. Description of Related Art

Malicious attacks are a serious threat to the security of information processing systems and devices. Side channel attacks use analyses of cache residency, branch prediction accuracy, power consumption, electromagnetic radiation, acoustic measurements, timing, or other characteristics of a data processing system, device, or process to infer information about the system, the device, or the data being processed. Many techniques have been developed to defend against side channel attacks, but more are needed as information processing system development continues.

BRIEF DESCRIPTION OF THE FIGURES

The present invention is illustrated by way of example and not limitation in the accompanying figures.

DETAILED DESCRIPTION

Embodiments of an invention for custom protection against side channel attacks are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As described in the background section, information might be leaked from a system through a side channel. Various techniques to protect a system, device, or process may be available; however, these techniques may increase power consumption and/or decrease performance. Furthermore, various factors may contribute the level of protection that is desired for any particular process, program, or sequence or instructions. For example, optimization of code, such as in connection with binary translation, may increase susceptibility to side channel attacks. Therefore, the use of embodiments of the present invention may be desired to provide different levels of side channel protection on the same system.

Figure 1:
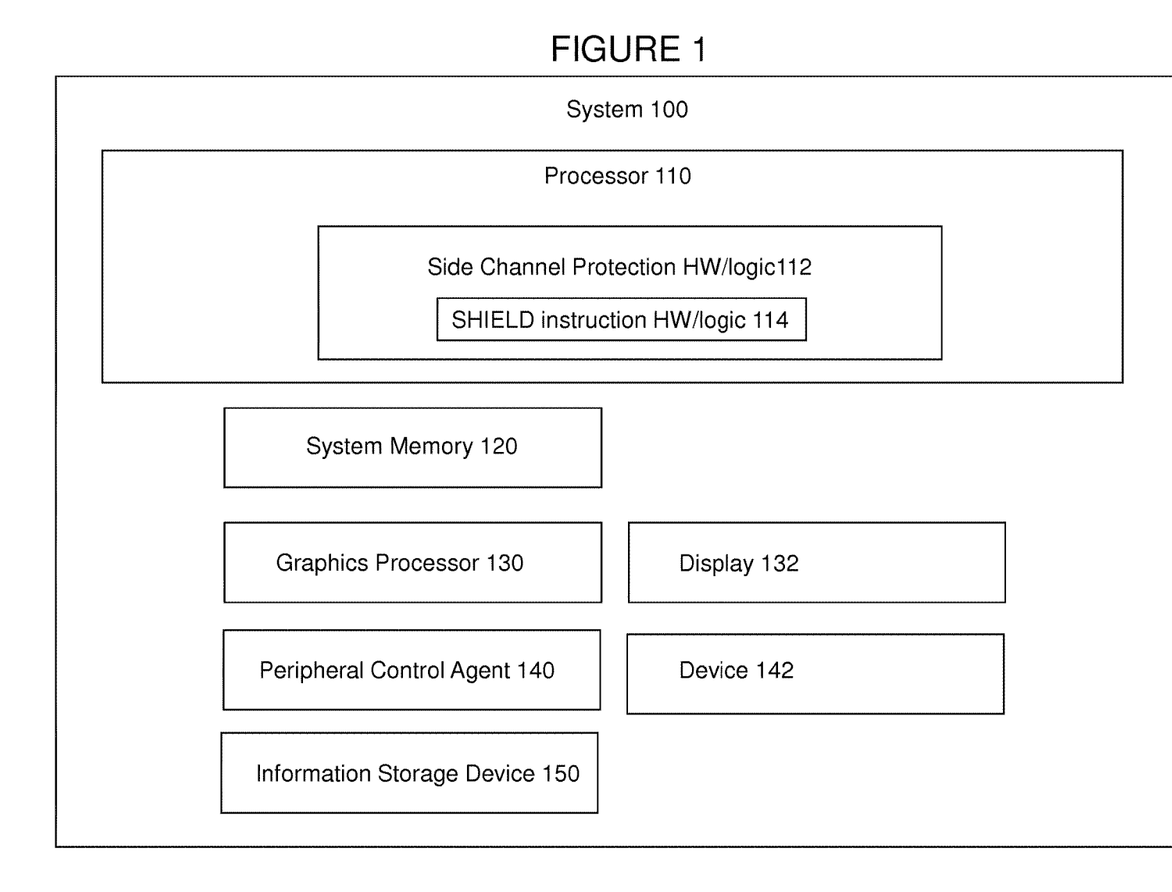
FIG. 1 illustrates a system including custom protection against side channels attacks according to an embodiment of the present invention.

FIG. 1 illustrates system 100, an information processing system including an embodiment of the present invention for custom protection against side channel attacks. System 100 may represent any type of information processing system, such as a server, a desktop computer, a portable computer, a set-top box, a hand-held device such as a tablet or a smart phone, or an embedded control system. System 100 includes processor 110, system memory 120, graphics processor 130, peripheral control agent 140, and information storage device 150. Systems embodying the present invention may include any number of each of these components and any other components or other elements, such as peripherals and input/output devices. Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

System memory 120 may be dynamic random access memory or any other type of medium readable by processor 110. Graphics processor 130 may include any processor or other component for processing graphics data for display 132. Peripheral control agent 140 may represent any component, such as a chipset component, including or through which peripheral, input/output (I/O), or other components or devices, such as device 142 (e.g., a touchscreen, keyboard, microphone, speaker, other audio device, camera, video or other media device, network adapter, motion or other sensor, receiver for global positioning or other information, etc.) and/or information storage device 150, may be connected or coupled to processor 110. Information storage device 150 may include any type of persistent or non-volatile memory or storage, such as a flash memory and/or a solid state, magnetic, or optical disk drive.

Processor 110 may represent one or more processors or processor cores integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 110 may be architected and designed to operate according to any instruction set architecture, with or without being controlled by microcode.

Support for customizing side channel attack prevention according to an embodiment of the present invention may be implemented in a processor, such as processor 110, using any combination of circuitry and/or logic embedded in hardware, microcode, firmware, and/or other structures arranged as described below or according to any other approach, and is represented in FIG. 1 as protection hardware and/or logic 112, which may include hardware and/or logic 114 to support a SHIELD instruction to customize side channel attack protection according to an embodiment of the present invention, as described below.

Figure 2:
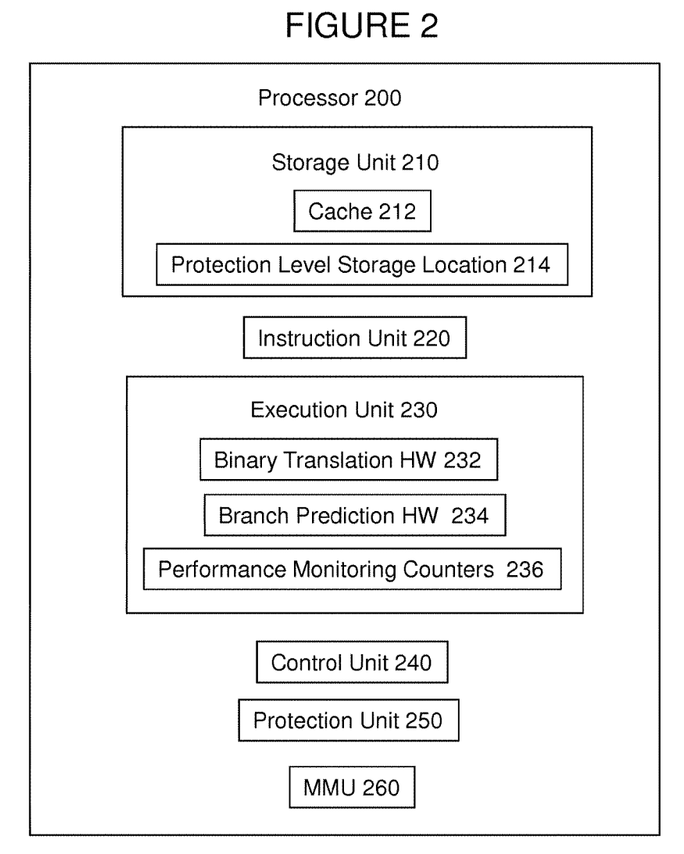
FIG. 2 illustrates a processor including custom protection against side channel attacks according to an embodiment of the present invention.

Processor 200 may include storage unit 210, instruction unit 220, execution unit 230, control unit 240, and protection unit 250, where protection unit 250 may correspond to protection hardware/logic 112 in FIG. 1. Processor 200 may also include any other circuitry, structures, or logic not shown in FIG. 1. Although shown as a separate unit in processor 200, the functionality of protection unit 250, as introduced above and further described below, may be contained in or distributed among any of the labeled units or elsewhere in processor 200. Furthermore, the functionality and/or circuitry of each of the described and/or illustrated units of processor 200 may be combined and/or distributed in processor 200 in any manner.

Storage unit 210 may include any combination of any type of storage usable for any purpose within processor 200; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 200, as well as circuitry usable to access such storage. Storage unit 210 may include one or more cache(s) 212.

In embodiments, storage unit 210 may include protection level storage location 214 in which to store one or more values to be used to control or configure side channel attack protection levels and/or techniques, as described below. The content of protection level storage location 214 may be saved to and restored from one or more designated locations in system memory 120, information storage device 150, and/or any other volatile or non-volatile memory or storage, according to the system architecture of system 100, in connection with a context switch.

Instruction unit 220 may include any circuitry, logic, structures, and/or other hardware, such as an instruction decoder, to fetch, receive, decode, interpret, schedule, and/or handle instructions to be executed by processor 200. Any instruction format may be used within the scope of the present invention; for example, an instruction may include an opcode and one or more operands, where the opcode may be decoded into one or more micro-instructions or micro-operations for execution by execution unit 230. Operands or other parameters may be associated with an instruction implicitly, directly, indirectly, or according to any other approach.

In an embodiment, instruction unit 220 may be designed to receive a SHIELD instruction, the execution of which by processor 200 is described below. Note that the name of this instruction is provided merely for convenience, and embodiments of the present invention may include such an instruction having any name desired. Note that various embodiments of the present invention are described and more may be possible, including various differences in the parameters of a SHIELD instruction and the response of a processor to a SHIELD instruction. Embodiments of the present invention may include any one or more of these variations. In various embodiments, different instructions may be used for each different variety of a SHIELD instruction, or they may be leaves of the same instruction.

Execution unit 230 may include any circuitry, logic, structures, and/or other hardware, such as arithmetic units, logic units, floating point units, shifters, etc., to process data and execute instructions, micro-instructions, and/or micro-operations. Execution unit 230 may represent any one or more physically or logically distinct execution units. Execution unit 230 may include hardware to provide special features and/or improved performance, such as binary translation support hardware 232, branch prediction support hardware 234, and performance monitoring counters 236.

Control unit 240 may include any microcode, firmware, circuitry, logic, structures, and/or hardware to control the operation of the units and other elements of processor 200 and the transfer of data within, into, and out of processor 200. Control unit 240 may cause processor 200 to perform or participate in the performance of method embodiments of the present invention, such as the method embodiments described below, for example, by causing processor 200, using execution unit 230 and/or any other resources, to execute instructions received by instruction unit 220 and micro-instructions or micro-operations derived from instructions received by instruction unit 220. The execution of instructions by execution 230 may vary based on control and/or configuration information stored in storage unit 210, where such control and/or configuration information may be stored in or programmed into protection level storage location 214 in connection with the execution of one or more SHIELD instructions.

Protection unit 250 may include any circuitry, logic, structures, and/or other hardware to implement any one or more hardware mechanisms and/or techniques to protect system 100, processor 200, and/or the execution of code by processor 200 from side channel attacks. Such techniques may include, but are not limited to, disabling or altering binary translation (e.g., binary translation support hardware 232), disabling or altering the operation of one or more cache memories (e.g., cache memory 212), disabling or altering branch prediction (e.g., branch prediction support hardware 234), disabling or altering the operation of performance monitoring counters (e.g., performance monitoring counters 236), etc. Therefore, protection unit 250 may include or represent circuitry or hardware to enable, disable, configure, reconfigure, or otherwise control circuitry or hardware in processor 200 used to support features or enhance performance of processor 200, where the use of such circuitry or hardware may increase susceptibility to side channel attacks. Note that such control circuitry or hardware may be physically located in execution unit 230, control unit 240, or elsewhere in processor 200, but may be described as included in protection unit 250 for convenience and/or ease of illustration.

Disabling of binary translation may be desired because, as an example, translation may result in the removal of unnecessary loads. However, in code that involves the use of cryptography, the unnecessary loads may have been added intentionally in order to hide the number and/or balance the ratio of loads in comparable code paths or branches, so as not to leak information (e.g., the ratio of zeroes to ones) regarding data in registers with which the loaded data is to be processed (e.g., a load may be unnecessary if the loaded data is to be logically ANDed with zero). In this case, embodiments of the present invention may be desired to provide for disabling the use of binary translation for this sensitive code but enabling the use of binary translation for other code.

Disabling or altering of branch prediction may be desired because, as an example, sophisticated branch prediction techniques base decisions on state maintained from prior executions of the code, making the code susceptible to leaking information through analysis of branching during repeated executions of the code. In this case, embodiments of the present invention may be desired to provide for reverting to stateless branch prediction (e.g., backwards-taken forward-not-taken) or no branch prediction for sensitive code but enabling the use of sophisticated, performance-enhancing branch prediction for other code.

Disabling or altering the use of one or more cache memories may be desired because, as an example, the frequency of cache misses and their impact on performance may leak information about memory access patterns during cryptographic table lookups. In this case, embodiments of the present invention may be desired to bypass shared caches for loads and stores in sensitive code, so that another process sharing the sensitive code's cache cannot gain cache-related information about the sensitive code, but enabling the use of performance-enhancing use of shared caches for other code.

Disabling or altering the operation of performance monitoring counters may be desired because, as an example, information about sensitive code may be leaked by repeated analysis of various measures of performance, such as cache misses, as explained above. In this case, embodiments of the present invention may be desired to provide for disabling the use of or adding noise or randomness to performance monitoring counters for sensitive code but enabling the use of these counters for other code.

Figure 3:
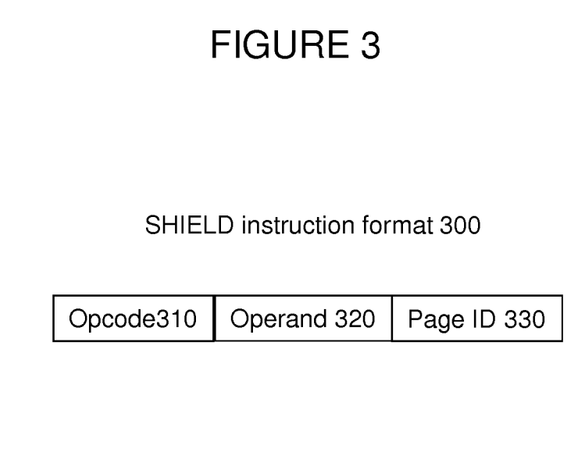
FIG. 3 illustrates a format of a shield instruction according to an embodiment of the present invention.

FIG. 3 illustrates a format 300 of an instruction according to an embodiment of the present invention. Format 300 may include any number of fields, each field including any number of bits. The total number of bits in format 300 may depend on the instruction set architecture of the processor. For example, format 300 may have a length of 32 bits, 64 bits, etc.

Format 300 includes a first field 310, which may be an operation encoding (opcode) field to specify the type of instruction. In embodiments, one or more particular values may be used as an opcode for a SHIELD instruction. The opcode may be one that results in the execution of no operation (NOP) according to one or more instruction set architectures with which a new or extended instruction set architecture is designed to be backward-compatible.

Format 300 may include a second field 320, which may be an operand field to specify one or more parameters or other values to be used by the instruction. Many variations of formats of operand field 320 for a SHIELD instruction are possible within the scope of the present invention, some of which are described below. Format 300 may include any number of additional operand fields, reserved fields, or any other fields.

In an embodiment, execution of a SHIELD instruction may include storing or writing the value in operand field 320 into protection level storage location 214. Therefore, the content of protection level storage location 214 may be used by processor 200 (e.g., control unit 240 and/or execution unit 230) to enable, disable, and/or control processor hardware (e.g., in protection unit 250 and/or execution unit 230) during the execution of code by processor 200, in order to implement varying levels of and/or techniques for protection against side channel attacks, as further described below.

In an embodiment, operand field 320 may be used to specify a level of protection to be used by processor 200 against side channel attacks. For example, a lowest value (e.g., zero) in operand field 320 may specify that no side channel protection is to be used. Therefore, execution of a SHIELD instruction with an operand of zero may result in the disabling and/or non-use of all side channel protection mechanisms, techniques, etc. available to be provided by processor 200. A highest value (e.g., all bits in operand field 320 are ones (MAXVAL)) may specify that all available side channel protection is to be used. Therefore, execution of a SHIELD instruction with an operand of MAXVAL may result in the enabling and/or use of all side channel protection mechanisms, techniques, etc. available to be provided by processor 200.

Operand values between zero and MAXVAL may be used, according to the architecture of the processor, to specify varying levels of protection against side channel attacks (e.g., values starting at zero and increasing to MAXVAL may specify increasing levels of protection). The definition and ranking of protection levels may be chosen and implemented in microcode, firmware, and/or hardware by the architects and/or designers of the processor. The choice of which level to use during execution of code may be made by software developers.

For example, any nonzero or positive value of the SHIELD operand may result in the disabling of binary translation; a higher value may result in the disabling of binary translation and the bypassing of a shared cache when performing loads and stores; and an even higher value may result in the disabling of binary translation, the bypassing of a shared cache when performing loads and stores, and stateless branch prediction; and a yet even higher value may result in the disabling of binary translation, the bypassing of a shared cache when performing loads and stores, stateless branch prediction, and disabling of performance monitor counters.

In an embodiment, operand field 320 may be used for a bitmask, where each bit in the bitmask may be used to enable or disable a particular hardware mechanism or technique to protect against side channel attacks. For example, a first bit in operand field 320 may be designated for disabling binary translation, a second bit for disabling the use of a shared cache, a third bit for disabling branch prediction, a fourth bit for disabling performance monitoring counters, etc.

Note that the preceding is a simple example, and many variations are possible within the scope of the present invention, some providing for finer granularity of control of hardware mechanisms or techniques. For example, two or more bits may control the use of performance monitoring counters: a first bit for disabling first counter or group of counters, a second bit for adding noise or randomness to the first counter or group of counters, a third bit for disabling a second counter or group of counters, a fourth bit for adding noise or randomness to the second counter or group of counters, etc.

As described above, embodiments of the present invention may provide for many different levels and types of side channel protection, where each may be used to protect any one or more sequences of code. However, for convenience, parts of this description may refer to "shielded" code and "unshielded" code to mean that, through the use of an embodiment of the present invention, a level or type of side channel protection is applied during the execution of a first code sequence (shielded code) by a processor, where that level or type of side channel protection is greater than a level or type, if any, of side channel protection applied during the execution of a second code sequence (the unshielded code) by the processor. In some embodiment, the unshielded code may be code that is executed is with the same level or type of side channel protection, if any, that is or would be applied when the processor is in a default state in which no SHIELD instruction has been executed.

Format 300 may include a third field 330, which may be an operand field to identify a page or other region of memory (e.g., of system memory 120) to which the specified level of protection is to be applied for execution of code from that page or region. Although various embodiments may provide for the size of the protected region to be a single page (of any size), a group of pages (e.g., grouped through the use of hierarchical page tables, as described below), and/or any other size or type of regions, third field 330 may be referred to as page ID field 330. In embodiments using a page ID field 330, the value (e.g., the value from operand field 320) or portion of the value that specifies the level of or otherwise defines the protection to be applied may be stored, in connection with execution of the SHIELD instruction, in an entry in a paging or other data structure or storage location corresponding to the identified page or region.

Processor hardware (e.g., memory management unit (MMU) 260), may reference the entry when the page or other region is accessed (e.g., fetched by instruction unit 220) and apply the specified protections (e.g., by loading the value into protection level storage location 214). The value may be stored in one or more entries at one or more levels of hierarchy in a memory management data structure (e.g., page tables (PTs), page directory table (PDTs), page directory pointer table (PDPTs), page map level 4 table (PML4 Ts), extended or nested PTs, extended or nested PDTs, extended or nested PDPTs, extended or nested PML4 Ts, etc.), such that the specified protection may be applied to groups of pages or other regions of memory accessed through any given level. The value may also or instead be stored in metadata associated with physical memory pages.

Embodiments of the present invention including the use of page ID field 330 may provide for transitions between unshielded code and shielded code (and vice versa) to occur without the execution of a SHIELD instruction between the execution of the unshielded code and the shielded code. For example, during the execution of unshielded code, a SHIELD instruction may be executed to designate a page as shielded, then the execution of unshielded code may continue before any code from that or any other shielded code is executed. In connection with any subsequent transfer of control (e.g., fall-through, branch, etc.) to code on the shielded page, processor hardware (e.g., MMU 260 and/or protection unit 250) may determine that the page is shielded and apply the requested protections prior to execution of the shielded code. Then, in connection with any subsequent transfer of control (e.g., fall-through, branch, etc.) to code on an unshielded page, processor hardware (e.g., MMU 260 and/or protection unit 250) may remove the protections prior to execution of the unshielded code.

As described above, embodiments of the present invention provide for the choice of which level of protection and/or the specification of the details of which protection to use during execution of code may be made by software developers. Therefore, developers of code, including system software, cryptographic and/or other library modules, virtual machine monitors, hypervisors, embedded security layers, etc., may use custom levels of and/or custom techniques for side channel attack protection, according to the sensitivity of the code, the desired or required degree of protection, the trade-off between protection and performance and/or power consumption, etc., without impacting the hardware-based features and/or level of performance available to other code.

Furthermore, software may be optimized or otherwise designed to leverage or otherwise take advantage of the use of SHIELD instructions to provide other protection or security techniques. In other words, the use of SHIELD instruction may be an indicator that a code sequence preceded by a protection-increasing SHIELD instruction and/or a code sequence preceding a protection-decreasing SHIELD instruction is sensitive and/or should be shielded. For example, an operating system may choose to perform additional scrubbing of registers or memory after shielded code is run. Anti-malware, intrusion-detection, or other security software may choose to increase its level of scrutiny during the execution of shielded code.

Figure 4:
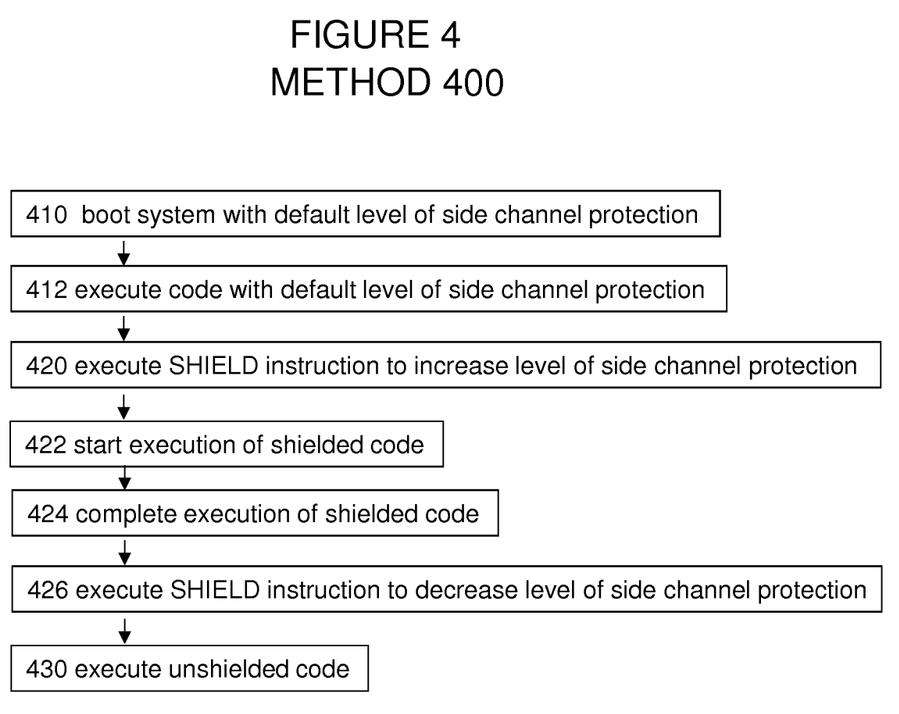
FIGS. 4 and 5 illustrate methods for custom protection against side channel attacks according to embodiments of the present invention.
Figure 5:
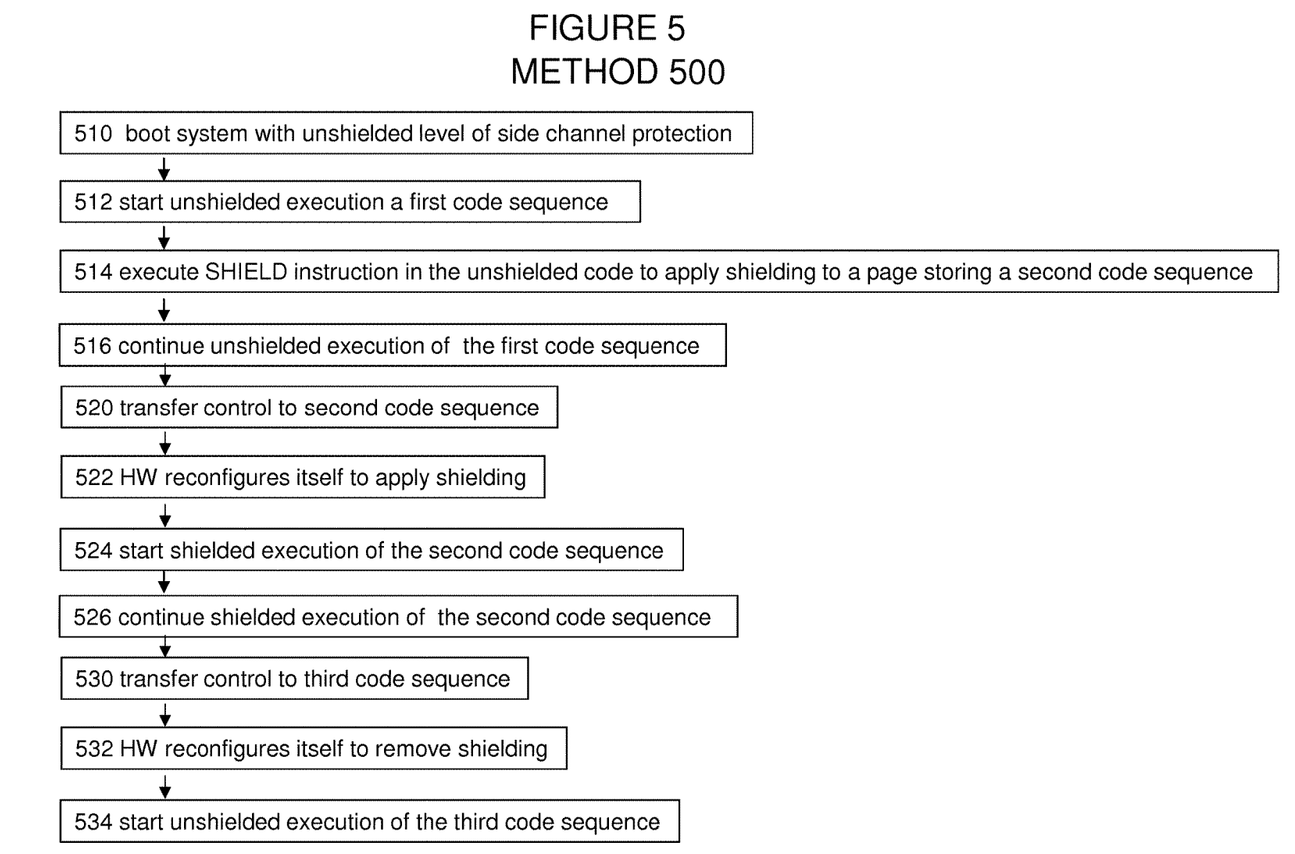

FIGS. 4 and 5 illustrate method 400 and 500, respectively, for custom protection against side channel attacks according to an embodiment of the present invention. Although method embodiments of the invention are not limited in this respect, reference may be made to elements of FIGS. 1, 2, and 3 to help describe the method embodiments of FIGS. 4 and 5. Various portions of methods 400 and 500 may be performed by hardware, firmware, software, and/or a user of a system or device.

In box 410 of method 400, a system is booted with a default level of side channel protection. In this embodiment, the default level is one in which no protection is applied, such that boot process may be executed at the highest available level of performance. Alternatively, the default level may be one in which a maximum or high level of protection is applied, for example if the boot process includes the generation of a cryptographic key. Alternatively, the default level may be anywhere in between, or may be dictated by the desire for backwards-compatibility with code developed with an instruction set architecture that does not include a SHIELD instruction.

In box 412, a first code sequence is executed at the default level of side channel protection. In box 420, a SHIELD instruction is executed to change the level of side channel protection. In this embodiment, the SHIELD instruction is executed to increase the level of side channel protection, for example, because the SHIELD instruction includes an operand that has a higher value than the value corresponding to the default level of protection.

In box 422, execution of a second code sequence begins, where execution is with a higher level of side channel protection than the default level; therefore, the second code sequence is shielded according to an embodiment of the present invention. In box 424, execution of the second code sequence ends.

In box 426, a SHIELD instruction is executed to change the level of side channel protection. In this embodiment, the SHIELD instruction is executed to decrease the level of side channel protection, for example, because the SHIELD instruction includes an operand that has a lower value than the value associated with the SHIELD instruction executed in box 420.

In box 430, execution of a third code sequence begins, where execution is with a lower level of side channel protection than the higher level of box 422; therefore, the third code sequence is unshielded, which may provide a higher level of performance than that provided for shielded code.

From box 430, method 400 may continue (not shown), including as many executions of a SHIELD instruction as desired, with as many different operand values as desired, to customize the system by providing for different code to run at many different operating points in the trade-off between protection and performance.

In box 510 of method 500, a system is booted with a default level of side channel protection. In this embodiment, the default level is unshielded. In box 512, execution of a first code sequence from a first memory page begins, with the execution at the unshielded level of side channel protection.

In box 514, a SHIELD instruction within the first code sequence is executed to apply a shielded level of side channel protection to a second memory page. For example, the SHIELD instruction may include, in operand field 320, a desired level of protection indicated and, in operand field 330, the ID of the second memory page.

In box 516, execution of the first code sequence continues at the unshielded level of side channel protection. In box 520, control of the processor is transferred to a second code sequence, where the second code sequence is from the second memory page.

In box 522, processor hardware, in response to the transfer of control from unshielded code to shielded code, reconfigures itself to apply the shielded level of side channel protection that was specified by the SHIELD instruction executed in box 514. In box 524, execution of the second code sequence from the second memory page begins, with the execution at the shielded level of side channel protection. In box 526, execution of the second code sequence continues at the shielded level of side channel protection. In box 530, control of the processor is transferred to a third code sequence (or back to the first code sequence), where the third code sequence is from an unshielded memory page.

In box 532, processor hardware, in response to the transfer of control from shielded code to unshielded code, reconfigures itself to remove the shielded level of side channel protection. In box 534, execution of the third code sequence begins, with the execution is at the unshielded level of side channel protection.

From box 534, method 500 may continue (not shown), including as many executions of a SHIELD instruction as desired, with as many different operand values and page IDs as desired, to customize the system by providing for different code to run at many different operating points in the trade-off between protection and performance.

In various embodiments of the present invention, the methods illustrated in FIGS. 4 and 5 may be performed in a different order, with illustrated boxes combined or omitted, with additional boxes added, or with a combination of reordered, combined, omitted, or additional boxes. Furthermore, method embodiments of the present invention are not limited to methods 400, 500, or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 400 and/or 500 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for custom protection against side channel attacks have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
branch prediction support hardware;
a shareable cache;
an instruction decode circuit to decode a shield instruction to provide for shielding code against side channel attacks, wherein the shield instruction is to include a first operand to specify a shield value, wherein the shield value is one of a plurality of shield values, the plurality of shield values to range from a minimum value to specify a minimum level of protection and a maximum value to specify a maximum level of protection and to have a plurality of intermediate values between the minimum value and the maximum value, the plurality of intermediate values to specify a ranking of levels of protection to increase between the minimum level and the maximum level, the ranking of levels of protection to be implemented in hardware to provide for a choice of level of protection to be made in software by specifying the shield value with the first operand;
protection circuitry to, in response to the shield instruction, configure the processor to provide a level of protection specified by the shield value, including to bypass the shareable cache in response to a first shield value, to use stateless branch prediction in response to a second shield value, and to bypass the shareable cache and use stateless branch prediction in response to a third shield value.

2. The processor of claim 1, further comprising binary translation support hardware, wherein execution of the shield instruction includes reconfiguring the processor to change operation of the binary translation support hardware.

3. The processor of claim 1, wherein execution of the shield instruction includes reconfiguring the processor to change operation of the branch prediction support hardware.

4. The processor of claim 1, wherein execution of the shield instruction includes reconfiguring the processor to change operation of the shareable cache.

5. The processor of claim 1, further comprising one or more performance monitoring counters, wherein execution of the shield instruction includes reconfiguring the processor to change operation of the one or more performance monitoring counters.

6. The processor of claim 1, further comprising a protection level storage location in which to store the value of the first operand.

7. The processor of claim 1, wherein the first operand is to specify a value of a bitmask, each bit of the bitmask to control operation of one of a plurality of hardware supported features.

8. The processor of claim 7, wherein the bitmask includes a bit to control operation of binary translation support hardware.

9. The processor of claim 7, wherein the bitmask includes a bit to control operation of the branch prediction support hardware.

10. The processor of claim 7, wherein the bitmask includes a bit to control operation of the shareable cache.

11. The processor of claim 7, wherein the bitmask includes a bit to control operation of one or more performance monitoring counters.

12. The processor of claim 1, wherein the shield instruction includes a second operand to specify an identifier of a memory region, wherein the specified level of protection is to be applied to code fetched from the memory region.

13. A method comprising:
receiving, by a processor, a shield instruction to provide for shielding code against side channel attacks, wherein the instruction includes an operand to specify a shield value, wherein the shield value is one of a plurality of shield values, the plurality of shield values to range from a minimum value to specify a minimum level of protection and a maximum value to specify a maximum level of protection and to have a plurality of intermediate values between the minimum value and the maximum value, the plurality of intermediate values to specify a ranking of levels of protection to increase between the minimum level and the maximum level, the ranking of levels of protection to be implemented in hardware to provide for a choice of level of protection to be made in software by specifying the shield value with the first operand;
executing, by the processor, the shield instruction, wherein execution of the instruction includes configuring the processor to provide a level of protection specified by the shield value, including to bypass a shareable cache in response to a first shield value, to use stateless branch prediction in response to a second shield value, and to bypass the shareable cache and use stateless branch prediction in response to a third shield value.

14. The method of claim 13, wherein execution of the shield instruction includes reconfiguring the processor to change operation of binary translation support hardware.

15. The method of claim 13, wherein execution of the shield instruction includes reconfiguring the processor to change operation of branch prediction support hardware.

16. The method of claim 13, wherein execution of the shield instruction includes reconfiguring the processor to change operation of the shareable cache.

17. The method of claim 13, wherein execution of the shield instruction includes reconfiguring the processor to change operation of one or more performance monitoring counters.

18. The method of claim 13, further storing the value of the operand in a protection level storage location in the processor.

19. A method comprising:
executing, by a processor, a first code sequence with an unshielded level of side channel protection;
executing, by the processor, a shield instruction to apply shielding to a memory region, wherein the instruction includes a first operand and a second operand, the first operand to specify a shield value, wherein the shield value is one of a plurality of shield values, the plurality of shield values to range from a minimum value to specify a minimum level of protection and a maximum value to specify a maximum level of protection and to have a plurality of intermediate values between the minimum value and the maximum value, the plurality of intermediate values to specify a ranking of levels of protection to increase between the minimum level and the maximum level, the ranking of levels of protection to be implemented in hardware to provide for a choice of level of protection to be made in software by specifying the shield value with the first operand, the second operand to specify an identifier of the memory region;
transferring control of the processor to a second code sequence, the second code sequence from the memory region;
reconfiguring, by the processor in response to determining that shielding has been applied to the memory region, the processor to apply shielding at a level of protection specified by the shield value, including to bypass a shareable cache in response to a first shield value, to use stateless branch prediction in response to a second shield value, and to bypass the shareable cache and use stateless branch prediction in response to a third shield value;
executing, by the processor, the second code sequence with a shielded level of side channel protection.

20. The method of claim 19, further comprising executing unshielded code between executing the instruction and transferring control.

21. A system comprising:
a system memory in which to store confidential information; and
a processor including
an instruction decode circuit to decode a shield instruction to provide for shielding code against side channel attacks, wherein the shield instruction is to include a first operand to specify a shield value, wherein the shield value is one of a plurality of shield values, the plurality of shield values to range from a minimum value to specify a minimum level of protection and a maximum value to specify a maximum level of protection and to have a plurality of intermediate values between the minimum value and the maximum value, the plurality of intermediate values to specify a ranking of levels of protection to increase between the minimum level and the maximum level, the ranking of levels of protection to be implemented in hardware to provide for a choice of level of protection to be made in software by specifying the shield value with the first operand;

protection circuitry to, in response to the shield instruction, configure the processor to provide a level of protection specified by the shield value, including to bypass a shareable cache in response to a first shield value, to use stateless branch prediction in response to a second shield value, and to bypass the shareable cache and use stateless branch prediction in response to a third shield value.

22. The system of claim 21, wherein the shield instruction includes a second operand to specify an identifier of a region of the system memory, wherein the specified level of protection is to be applied to code fetched from the region of the system memory.

* * * * *